Figure 1:
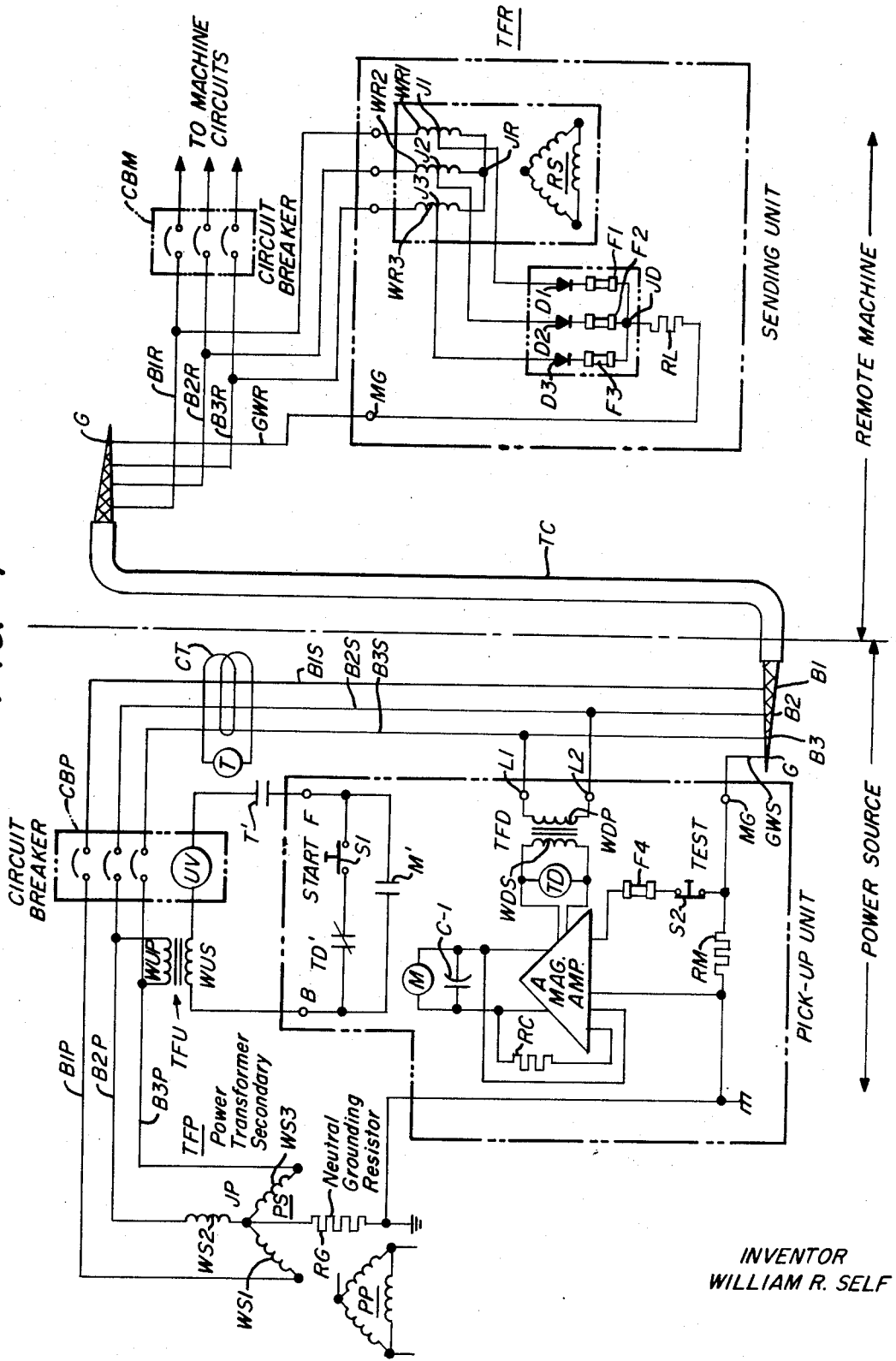

United States Patent

Self

[15] 3,697,809
[45] Oct. 10, 1972

[54] GROUND WIRE MONITORING SYSTEM WITH FAIL-SAFE POWER DISCONNECT

[72] Inventor: William R. Self, 1205 West First Street, Oil City, Pa. 16301

[22] Filed: Nov. 23, 1970

[21] Appl. No.: 91,669

[52] U.S. Cl. ............................................. 317/18 C
[51] Int. Cl. ............................................. H02h 1/02
[58] Field of Search ..... 317/10, 18, 18 A, 18 B, 18 C, 317/18 D

[56] References Cited

UNITED STATES PATENTS 3,196,316   7/1965   Crom ....................... 317/18 C
3,579,037   5/1971   Hackman et al. ......... 317/18 D Primary Examiner—D. X. Sliney
Attorney—E. Wallace Breisch

[57] ABSTRACT

A system for monitoring the continuity of a ground wire between a remote machine, such as a mining machine, and a power source supplying polyphase power to the machine via a plurality of conductors wherein a DC signal is provided at the machine in response to the purchase power. The DC signal is applied to the ground wire for transmission to the power source, with the receipt of the DC signal at the power source being indicative of continuity of the ground wire and the absence of the DC signal being indicative of non-continuity, such latter indication being employable to disconnect the power from the remote machine.

11 Claims, 2 Drawing Figures

INVENTOR
WILLIAM R. SELF

GROUND WIRE MONITORING SYSTEM WITH FAIL-SAFE POWER DISCONNECT

The present invention relates to monitoring systems and, more particularly, to monitoring systems for monitoring the ground continuity between a remote location and the source of power.

Federal regulations promulgated under the Coal Mine Health and Safety Act of 1969 require that the ground fault current be limited to 25 amperes in mining machinery supplied from a three-phase alternating current power source via a trailing cable by connecting a suitable ground resistor between the neutral connection of the power transformer secondary and ground. The regulations additionally require in such resistance ground systems that a ground wire be supplied along with the power conductors to serve as a grounding conductor for the frames of all electrical equipment supplied by the power source. It is also necessary under the regulations that the continuity of the ground wire between the mining machine and supply source ground be continuously monitored and that the loss of continuity be sensed to cause the power circuit breaker to be opened in response to loss of continuity, thus disconnecting power from the remote machine and providing a fail-safe mode of operation.

One arrangement which has been suggested for monitoring the continuity of the ground wire is to connect a pilot wire between the power source and the remote machine in addition to the three power conductors and the ground wire. With the addition of the pilot wire, a DC signal provided at the power source is transmitted therefrom to the remote machine and then back through the ground wire. The receipt of the DC signal would be indicative of continuity and the non-receipt would be indicative of discontinuity, which may be employed to cause the tripping of the power circuit breaker. There are a number of disadvantages to requiring the use of an additional pilot wire to the already necessary power conductors and ground wire. First, there will be increased expense in a system requiring a pilot wire connected between the power source and the remote machine in addition to the already existing conductors. Secondly, the continuity of the pilot wire itself must be preserved in order that a false indication of a loss of ground wire continuity is not given; thus enhancing the possibility of a mining machine being taken out of operation until the source of the discontinuity is determined. Lastly, if a pilot wire must be added to existing mining equipment, in all probability such an installation would be more expensive than if only the existing power conductors and the ground wire could be employed to provide the same type of fail-safe operation.

Broadly, the present invention provides a system for monitoring the ground continuity between a power source and a remote machine wherein a DC signal is generated at the machine and applied to the ground wire, with the presence or absence of the DC signal at the power source being indicative of the continuity or discontinuity of the ground wire.

Figure 2:
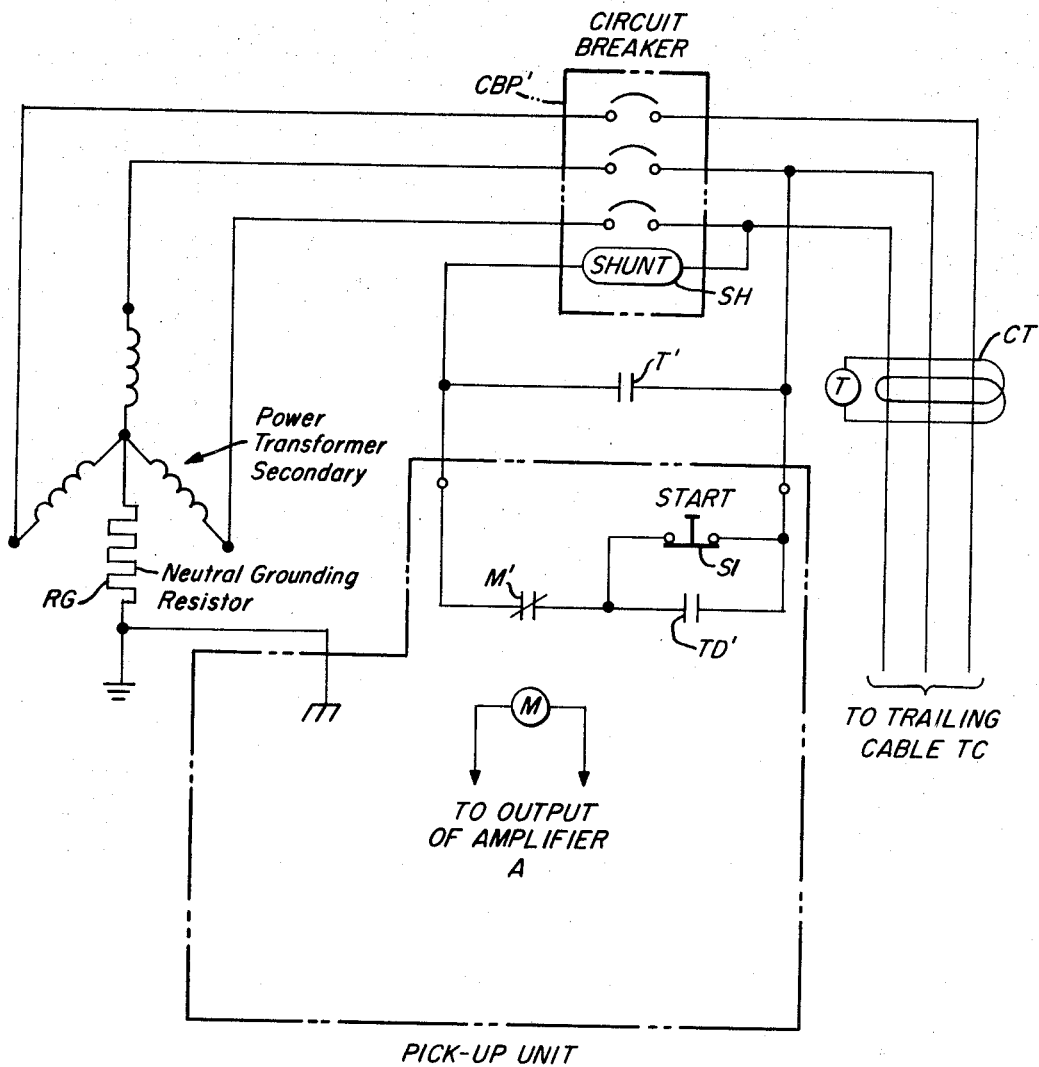

These and other objects and advantages of the present invention will become readily apparent from a reading of the following description and drawings in which:

FIG. 1 is a schematic diagram of the ground monitoring system of the present invention; and FIG. 2 is a schematic diagram of the power source portion of the present invention employing a shunt type of power circuit breaker.

Referring to FIG. 1 the system is shown divided into two portions, namely, a power source and a remote machine. In mining operations the power source commonly would be located at the entrance of the mine or other suitable power center where three-phase alternating current power is available. The remote machine, which may comprise any of the various types of mining machinery operative from three-phase alternating current power, is connected to the power source by a trailing cable TC, which may comprise a standard multiconductor coaxial cable commonly known in the industry as type "G" cable and which is commonly employed as trailing cable in the mining industry. The cable TC is shown to include three power conductors B1, B2 and B3 and a ground wire G.

At the power source a power transformer TFP is provided which includes a primary winding PP connected in a delta configuration and which receives the three-phase input from a locally available source. The power transformer TFP also includes a secondary winding PS including three windings WS1, WS2 and WS3 connected in a "Y" configuration. A neutral grounding resistor RG is connected between the neutral point JP of the power transformer secondary PS and ground, which establishes the power source ground for the entire system. The neutral grounding resistor RG is selected to have such a resistance value and rating to limit the ground fault current to 25 amperes as required by federal regulations.

The outside ends of the secondary windings WS1, WS2 and WS3 are respectively connected via conductors B1P, B2P and B3P to the source side of the power circuit breaker CBP which is of the under-voltage coil trip type. The circuit breaker CBP is shown in its open (tripped) state. Conductors B1S, B2S and B3S respectively connect the load side of the circuit breaker CBP to the trailing cable TC at the respective coaxial conductors B1, B2 and B3 thereof.

At the remote machine the conductors B1R, B2R and B3R respectively tap into the trailing cable TC at the coaxial conductors B1, B2 and B3 of the trailing cable TC. The conductors B1R, B2R and B3R are connected to one side of a machine circuit breaker CBM which when closed will supply three-phase AC power to machine circuits, not shown, such as driving motors, pump motors, etc.

The start-up procedure for the present system is as follows. A start switch S1 is closed which completes a circuit path for energizing an under-voltage relay coil UV in the power circuit breaker CBP. The energizing circuit for the under-voltage relay coil UV includes a secondary winding WUS of a transformer TFU which has its primary winding WUP connected across the B2P and B3P conductors at the secondary of the power transformer TFP. With the closing of the start switch S1, a circuit path is provided for the under-voltage relay coil from the secondary winding WUS, through normally closed contacts TD', the start switch S1 and normally closed contacts T'. The energization of the under-voltage relay coil UV permits the closing of the circuit breaker CBP which thus supplies three-phase AC power via the conductors B1S, B2S and B3S and the trailing cable TC to the remote machine.

A current transformer CT is disposed about the three conductors B1S, B2S and B3S with a relay coil T connected in series therewith. The relay coil T will remain in an unenergized state with equal current flowing in opposite directions through the current transformer CT. This will be the normal state unless a ground fault should occur in one of the power conductors B1, B2, B3. Thus, if a ground fault should occur in one of the conductors, an unbalanced state would exist at the current transformer CT which would cause the energization of the relay coil T, thereby causing the normally closed contacts T' in the under-voltage relay coil circuit to open. This would cause the de-energization of the under-voltage coil UV and the tripping of the circuit breaker CBP to remove power from the remote machine. Under normal conditions with equal current flowing in both directions through the current transformer CT, the contacts T' will remain in their normally closed condition, thereby maintaining the energization of the under-voltage coil UV.

At the closing of the power circuit breaker CBP, the timing of a delay relay coil TD is instigated with energization being provided to the relay coil TD via a transformer TFD having its primary WDP connected across the conductors B2S and B3S and having its secondary winding WSD connected across the coil TD. The delay of the delay relay TD is selected to be a sufficient time period to sense whether or not there is ground wire continuity. For example, a time of approximately one second may be employed. After the predetermined time has elapsed, the contacts TD' associated with the coil TD will change from their normally closed state to an open state, thereby open-circuiting the under-voltage relay circuit and tripping the power circuit breaker CBP, unless an alternate circuit path is provided for the under-voltage coil UV. An alternate circuit path shunting the contacts TD' and the start switch S1 is provided by normally open contacts M'. The closing of the contacts M' would thus maintain the energization of the under-voltage coil UV if the relay coil M associated with the contacts M' is energized prior to elapsing of the delay time of the relay TD.

Under normal operating conditions, the energization of the relay coil M occurs as follows. With current being supplied to the machine, the primary winding WR1 of a reference transformer TFR is energized. The primary winding WR1 is connected in a "Y" configuration with the outside ends of the windings WR1, WR2 and WR3 thereof respectively connected to the conductors B1R, B2R and B3R and the other ends commonly connected to a reference neutral junction JR. The secondary winding RS of the reference transformer TFR is connected in a delta configuration.

A low voltage tap point is respectively provided on each of the primary windings WR1, WR2 and WR3 so that a predetermined low magnitude alternating voltage is developed thereacross with respect to the junction JR. The tap points on each of the windings WR1, WR2 and WR3 are respectively connected to the anode electrodes of diodes D1, D2 and D3. The cathodes of diodes D1, D2 and D3 are connected respectively via fuses F1, F2 and F3 to a common junction JD. The fuses F1, F2 and F3 in series with the diodes D1, D2 and D3, respectively, are employed to protect the transformer TFR in case of diode failure. The common junction JD is connected via a load resistor RL and conductor GWR to the ground wire G of the coaxial trailing cable TC. The resistor RL serves as a load for the diodes D1, D2 and D3 and limits the current in the ground wire circuit. At the power source, the ground wire G of the trailing cable TC is connected via a conductor GWS and a resistor RM to the system ground to which the neutral grounding resistor RG is connected.

Thus, assuming that continuity exists through the ground wire G of the trailing cable TC, a unidirectional current path will be established from the junction JD, through the resistor RL, the conductor GWR, the ground wire G of the trailing cable TC, the conductor GWS and the resistor RM to system ground. The low magnitude alternating voltage at the taps of windings WR1, WR2 and WR3 will cause a low magnitude alternating current to be applied to diodes D1, D2 and D3, which will be half-wave rectified therein respectively. Thus, a half wave three phase rectified DC signal will appear at the common junction JD of the diodes D1, D2 and D3. This DC signal will be transmitted through the resistor RL, the ground wire G (assuming continuity) and resistor RM to ground. In response to the direct current through the resistor RM, a voltage will be developed thereacross which will have a predetermined value under normal operating conditions. This predetermined voltage developed across resistor RM is applied as the input of an amplifier A (which may comprise a magnetic amplifier) via a normally closed test switch S2 and a fuse F4 connected between the ungrounded end of the resistor RM and the amplifier A. Input power for the magnetic amplifier A is supplied from the secondary winding WS2 of the transformer TFD. The magnetic amplifier A may have a voltage gain of, for example, 150, so that in response to the predetermined voltage developed across the resistor RM an amplified output is supplied sufficient to energize a monitor coil M connected thereacross. A capacitor C1 is connected also across the output of the magnetic amplifier A to improve its response, and a resistor RC is connected into a second control winding of the magnetic amplifier for feed-back control purposes.

The amplified output of the magnetic amplifier A energizing the coil M causes the contacts M' to close, thereby providing an alternate circuit path to the under-voltage relay coil UV, so that, when the timing relay contacts TD' opens after the time delay, the under-voltage coil UV will remain in an energized state and the circuit breaker CBP will continue to supply power to the machine. The start switch S1 may be selected to have a slight time delay before opening once depressed sufficient enough to permit the contact M' to be picked up under normal operating conditions.

The resistor RM at the input of the magnetic amplifier A is the only resistance added to the ground wire circuit and may be selected to have a very low value, for example, 0.15 ohms, rated at 25 amperes.

In sum, as long as the DC signal generated at the junction JD is transmitted via the ground wire G of the trailing cable TC to cause a predetermined voltage to be developed across the monitoring resistor RM, hence causing the magnetic amplifier A to energize the coil M at its output, the continuity of the ground wire W of the trailing cable TC has been ascertained insuring safe operation of the machine. On the other hand, if there should be discontinuity in the ground wire G, the DC signal provided at the junction JD would be transmitted through the ground wire G to the monitor resistor RM. Thus, the input to the magnetic amplifier A would be interrupted and the output thereof would be terminated thereby deenergizing the coil M and causing the under-voltage coil UV of the circuit breaker CBP to be de-energized and the circuit breaker CBP to be open circuited, thereby removing power from the machine. The circuit breaker CBP could not be closed again for a period longer than the time delay of the relay TD since after the time delay the under-voltage relay circuit would be opened by the opening of the contacts TD' unless the contacts M' associated with the coil M are picked up during this time interval. If there is discontinuity in the ground wire G of the trailing cable TC, no DC signal will be transmitted to the monitor resistor RM; therefore, no input will be provided to the magnetic amplifier A so that the coil M will not be energized. Thus, the power circuit breaker CBP will be tripped again even if it is attempted to restart the system by closing the start switch S1.

The fuse F4 at the input of the magnetic amplifier A is selected to fail if the monitor resistor RM should open circuit. By opening the test switch the fail-safe operability can be checked. Either the opening of the test switch S1 or the failure of the fuse F4 would cause the input to the amplifier A to be interrupted so that the monitor coil M would be de-energized causing the de-energization of the under-voltage coil UV and the tripping of the circuit breaker CBP.

The system described for monitoring ground wire continuity may be conveniently added to presently existing systems as may be seen by the addition at the remote machine of the components within the dotted box legended "sending unit" and the necessary interconnections to the already existing conductors of the trailing cable TC and by the addition at the power source of the components within the dotted box legended "pick-up unit" and the necessary interconnections to the trailing cable TC and system ground. By the addition of the sending unit and the appropriate connections into the existing system, the DC signal will be developed for application to the ground wire G of the existing trailing cable TC. At the power source, the addition of the pick-up unit will provide the necessary circuitry for monitoring ground wire continuity, with fail-safe operation being accomplished without the addition of a pilot wire and appropriate interconnections at the power source and remote machine.

FIG. 2 shows a modification of the present invention wherein a shunt type of power circuit breaker CBP' is employed wherein a shunt trip coil SH is utilized which when energized will cause the circuit breaker CBP' to trip. The start-up procedure is as follows. The start switch S1, which is a normally closed switch, is opened, which opens the shunt coil SH circuit. The circuit breaker CBP' is then closed to supply current via the trailing cable TC to the machine and also to start the timing process of the delay relay TD as explained with reference to FIG. 1. The delay contacts TD', however, in FIG. 2 are normally open contacts and are connected directly across the switch S1. If continuity exists through the ground wire G of the trailing cable TC, the DC signal from the sending unit will be applied to energize the monitor coil M as described with reference to FIG. 1 and cause the relay contacts M' which are normally closed in the embodiment of FIG. 2 to open, thereby insuring that the shunt coil SH will not be energized under continuity conditions even after the contacts TD' close. Normally open contacts T' are connected directly across the shunt coil SH and are associated with the relay coil T of the current transformer CT. Under normal conditions, with no ground fault at any of the power conductors, the coil T will remain in an unenergized state thereby maintaining the contacts T' in an open condition. If a ground fault should occur in any of the power conductors, the coil T will be energized thereby closing the contacts T' to energize the shunt coil SH and cause the circuit breaker CBP' to open.

Accordingly, if no DC signal is received by the pick-up unit the monitor coil M at the output of amplifier A will become de-energized to cause the contacts M' associated therewith to close thereby completing a circuit path through the shunt SH and causing the circuit breaker CBP' to trip. Under normal operating conditions with a DC signal being received by the pick-up unit, the contacts M' will be in their open state thereby preventing the energization of the shunt SH so that the circuit breaker CBP' continues in its closed state supplying current to the remote machine.

What is claimed is:

1. In apparatus including a power source for supplying a remote machine with polyphase current via a plurality of conductors and wherein a single ground wire is connected between power source ground and said remote machine, a system for monitoring the continuity of said ground wire comprising: conversion means at said remote machine for providing a DC signal in response to said polyphase current supplied at said machine and for applying said DC signal to said ground wire alone for transmission to said power source; and sensing means at said power source responsive to the presence of said DC signal to provide an indication of continuity of said ground wire and responsive to the absence of said DC signal to provide an indication of non-continuity of said ground wire.

2. The system of claim 1 wherein said apparatus includes circuit breaker means for disconnecting said polyphase current from said remote machine in response to said indication of non-continuity.

3. The system of claim 2 wherein: said conversion means includes a rectifying means responsive to said alternating current for providing said DC signal.

4. The system of claim 3 wherein: said conversion means includes winding means responsive to said alternating current for providing a suitable output for application to said rectifying means.

5. The system of claim 2 wherein: said sensing means includes monitor impedance means operatively connected between said ground wire and said power source ground and responsive to said DC signal to provide a predetermined input signal, and amplifying means responsive to said predetermined input signal to provide an output as said indication of continuity of said ground wire, said circuit breaker means operative to disconnect said remote machine in response to the absence of said output from said amplifying means.

6. The system of claim 4 wherein said apparatus includes a polyphase power transformer having a neutral junction thereon, a neutral grounding impedance means connected between said junction and said power source ground to limit ground fault current to within predetermined limits, said winding means of said conversion means comprising a polyphase reference winding, and said rectifying means includes a plurality of rectifying devices connected respectively to each phase of said polyphase reference winding to provide said DC signal.

7. The system of claim 6 wherein: said polyphase reference winding having tap points on the respective windings thereof for developing said suitable output for application to said rectifying devices respectively.

8. The system of claim 7 includes: load impedance means for connecting each of said plurality of rectifying devices to said ground wire at said remote machine.

9. The system of claim 5 wherein said circuit breaker means includes a trip coil which when in a first state will permit said circuit breaker to remain closed and when in a second state will cause said circuit breaker means to trip, said system includes: means responsive to said output of said amplifying means to cause said trip coil to be placed in said first state and in the absence of said output to be placed in said second state.

10. The combination of claim 9 includes: start switch means for instigating the start-up of said system; and time delay means responsive to said instigation of start-up to cause said trip means to be placed in said first state for a predetermined time and then to revert to said second state after said predetermined time unless said output from said amplifying means is provided in response to said DC signal being received at said power source.

11. The combination of claim 10 wherein said start switch means and said time delay means are located at said power source.

* * * * *